Patented Dec. 24, 1946

2,413,249

UNITED STATES PATENT OFFICE 2,413,249

1,5-BIS-(1-NITRO-3,5-DIOXACYCLOHEXYL)-2,4 DIOXAPENTANE

Murray Senkus, Terre Haute, Ind., assignor to Commercial Solvents Corporation, Terre Haute, Ind., a corporation of Maryland No Drawing. Application May 7, 1945, Serial No. 592,520

1 Claim. (Cl. 260—338)

This invention relates to 1,5-bis(1-nitro-3,5-dioxacyclohexyl)-2,4-dioxapentane and to a process for preparing it.

It relates particularly to a new composition of matter having the following structural formula:

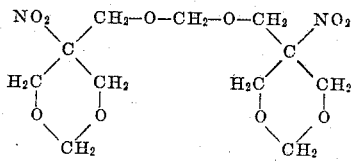

and to a method for preparing it by the reaction between tris(hydroxymethyl)nitromethane and an excess of formaldehyde in the presence of an acid catalyst.

In the past polyhydroxy nitro compounds have been condensed with aldehydes to form cyclic nitro acetals as described in my U. S. Patent No. 2,297,921 issued October 6, 1942. When tris(hydroxymethyl)nitromethane is condensed with formaldehyde according to the process of that patent, in which equimolecular quantities of tris-(hydroxymethyl)nitromethane and formaldehyde or a slight excess of formaldehyde are used, a nitroacetal of the character there described is formed.

I have now found, that when tris(hydroxymethyl)nitromethane is mixed with, and allowed to react with, a large excess of formaldehyde, as described hereinafter, high yields of an entirely new type of acetal are produced having the structure described above.

By an excess of formaldehyde I mean an excess over the combining ratio necessary to produce the product of my invention. That is, an excess over the ratio of 2 moles of tris(hydroxymethyl)-nitromethane to 3 moles of formaldehyde. I prefer that the excess of formaldehyde be large, preferably about 100% excess or a mole ratio of tris(hydroxymethyl)nitromethane to formaldehyde of 1 to 3. An even greater excess of formaldehyde does no harm, and may be desirable, particularly where formaldehyde is used in its aqueous solution. The excess formaldehyde can be recovered for reutilization.

The reaction may be represented as follows:

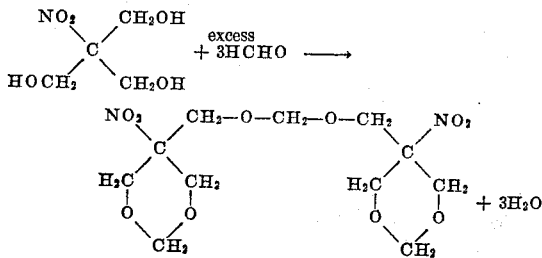

In preparing the new compound of my invention, I mix tris(hydroxymethyl)nitromethane with an excess of formaldehyde, either in the form of aqueous formaldehyde solution or in its para or polymeric form, for example as trioxymethylene. The mixture is caused to react, for example by heating and distillation in the presence of a mineral acid catalyst such as sulfuric acid, p-toluene-sulfonic acid, benzenesulfonic acid or the like. Water may be removed as formed, for example, by distillation and the product further dried if desired, by distillation with a material which forms an azeotrope such as benzene. The mixture is then refluxed under conditions which permit removal of water, for example by refluxing in a vessel connected to a condenser and a water trap in which water and benzene are separated, the water discharged, and the benzene returned to the still. After the water has been removed, the residue may be treated to neutralize the acid catalyst, as by repeated washing or by treatment with a neutralizing agent such as sodium bicarbonate. Upon cooling, the solid product 1,5-bis(1-nitro-3,5-dioxacyclohexyl)-2,4-dioxapentane crystallizes and may be separated from the mixture by any desired means for example, by filtration. The product is usually quite pure at this stage, but if desired it may be further purified, for example by recrystallization.

The 1,5 - bis(1-nitro-3,5-dioxacyclohexyl)-2,4-dioxapentane is a white crystalline solid having a melting point of 162.2° C. The product is soluble in acetone, hot benzene and hot methanol, but insoluble in water, cold benzene and cold methanol. It dissolves with decomposition in hot, dilute sulfuric acid.

My new compound is useful in the preparation of the corresponding diamines by catalytic hydrogenation of the nitro compound, described in my copending application Serial No. 592,521 filed as of even date herewith. The diamine is useful in the preparation of polymeric materials, for example by reaction with polybasic acids, and as an intermediate in other organic reactions.

The following specific examples will further illustrate my invention.

*Example I*

A mixture of 110 parts of tris(hydroxymethyl)-nitromethane, 220 parts of 36% aqueous formaldehyde and 48 parts of p-toluenesulfonic acid as catalyst was placed in a distillation vessel equipped with a column, and the mixture was distilled until the temperature of the mixture had reached 120° C. To the residue was added 200 parts of benzene, and the mixture was placed in a vessel equipped with a condenser and moisture trap, and refluxed for about 16 hours until water had ceased separating in the trap. The mixture was then cooled, whereupon 10 parts of sodium bicarbonate dissolved in 150 parts of water was added, the mixture was stirred for ninety minutes and filtered. The filtration yielded 80 parts of crude 1,5-bis(1-nitro-3,5-dioxacyclohexyl)-2,4-dioxapentane, corresponding to a yield of 65% based on the tris(hydroxymethyl)nitromethane. The product had a nitrogen analysis of 8.03 as compared to a theoretical value of 8.28 calculated for $C_{11}H_{18}N_2O_{10}$.

Example II

A mixture of 110 parts of tris(hydroxymethyl)-nitromethane, 220 parts of 36% aqueous formaldehyde and 1 part of 6N sulfuric acid catalyst was placed in a vessel, and distilled until the temperature of the mixture reached 116° C. To the residue was added 200 parts of benzene, and the mixture was refluxed with a column and water trap for 17 hours, until separation of water ceased. Then 21 parts of sodium bicarbonate dissolved in 100 parts of water was added and the mixture agitated for 30 minutes, and filtered. The filtration yielded 71 parts of crude 1,5-bis-(1 - nitro - 3,5 - dioxacyclohexyl) - 2,4 - dioxapentane corresponding to a yield of 58% based on the tris(hydroxymethyl)nitromethane.

Example III

A mixture of 110 parts of tris(hydroxymethyl)-nitromethane, 49.5 parts of trioxymethylene, i. e., a ratio of 2.25 moles formaldehyde per mole of tris(hydroxymethyl)nitromethane and 2 parts of p-toluenesulfonic acid catalyst was placed in a distillation vessel equipped with a column and distilled until the temperature of the mixture reached about 120° C. To the residue was added 200 parts of benzene and the mixture was placed in a vessel connected to a condenser through a moisture trap. The mixture was refluxed for several hours until water had ceased separating in the trap. The residue was neutralized with sodium bicarbonate solution, agitated, and filtered. The filtration yielded 117 parts of 1,5-bis(1 - nitro - 3,5 - dioxacyclohexyl) - 2,4 - dioxapentane, corresponding to a yield of 95%.

Example IV 1,5 - bis(1 - nitro - 3,5 - dioxacyclohexyl) - 2,4-dioxapentane was prepared in the same manner as described in Example III except that 66 parts of trioxymethylene was used instead of 49.5. This corresponds to a mole ratio of 1 mole tris-(hydroxymethyl)nitromethane to 3 moles of formaldehyde as trioxymethylene. In this case 123 parts of product was obtained corresponding to a yield of 100%.

While the above describes the preferred embodiments of my invention, it will be understood that departures may be made therefrom within the scope of the specification and claim.

What is claimed is:

As a new composition of matter 1,5-bis(1-nitro - 3,5 - dioxacyclohexyl) - 2,4 - dioxapentane, having the structure:

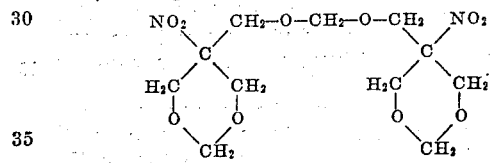

MURRAY SENKUS.